United States Patent [19]

Tamblyn

[11] 3,945,432

[45] Mar. 23, 1976

[54] AIR CONDITIONING METHOD AND SYSTEM

[76] Inventor: Robert Teudar Tamblyn, Littlebrook Farm, R.R. No. 2, Gormley, Ontario, Canada

[22] Filed: Sept. 6, 1974

[21] Appl. No.: 504,672

Related U.S. Application Data

[63] Continuation of Ser. No. 237,413, March 23, 1972, abandoned.

[30] Foreign Application Priority Data

Feb. 10, 1972  Canada.................................. 134438

[52] U.S. Cl. ..................... 165/22; 165/26; 165/50;
62/201
[51] Int. Cl.² ........................................... F24F 3/00
[58] Field of Search ............. 165/22, 26, 50; 62/201

[56] References Cited
UNITED STATES PATENTS

| | | | |
|---|---|---|---|
| 1,425,267 | 7/1920 | Marshall .................................. | 62/201 |
| 2,930,593 | 3/1960 | Blum ...................................... | 165/50 |
| 3,024,008 | 3/1962 | Blum ...................................... | 165/50 |
| 3,670,806 | 6/1972 | McFarlan .............................. | 165/22 |
| 3,780,532 | 12/1973 | Norbeck et al. ....................... | 62/201 |

*Primary Examiner*—Albert W. Davis, Jr.
*Assistant Examiner*—James D. Liles
*Attorney, Agent, or Firm*—Watson, Cole, Grindle & Watson

[57] ABSTRACT

A method and system of air conditioning multi-storey buildings having a plurality of floors to be conditioned wherein at least one compartment air handling unit on each floor is contained within a fan closet. Fresh air conditioning means is located remote from the closets and feeds the closets with fresh air preconditioned as to temperature and humidity. The fresh air mixes with return air from the floor in the closet and the mixture is conditioned in said compartment unit and supplied to various spaces on the floor for balancing the cooling load in the space. The air mixture is supplied at a base temperature and variable air volume terminals control the amount of cool air entering the space. The base temperature of the air mixture is controlled by a thermostat in the chilled water return line controlling the capacity of mechanical cooling means, the capacity of a cooling tower when it is used as a free cooler and chilled water heating means, depending on outdoor temperatures, in order to maintain a predetermined temperature differential between the air mixture and chilled liquid in the return line. The compartment air handling units are self-contained and presilenced with one sided maintainance. Perimeter radiation units are supplied with heated liquid scheduled to a temperature where building fabric heat loss is neutralized. During a heat reclaim cycle wherein internal building heat is transferred to the radiation liquid through a condensing liquid circuit having a cooling tower, the evaporative cooling capacity of the cooling tower is varied inversely to the outdoor temperature to increase the heat transferred. The perimeter radiation units are thinfinned and include support mullions capable of containing sound absorbing means. Front panels hanging from the mullions provide easy access to the inside of said radiation units.

19 Claims, 12 Drawing Figures

|  | Vent'n Air | | | Compartment Air | | Chilled Water | | | | | | Tower Water (Reclaim) | | | Rad'n Wat. | Tower Water (No Reclaim) | | |
|---|---|---|---|---|---|---|---|---|---|---|---|---|---|---|---|---|---|---|
|  | $T_{v1}$ | $T_{v2}$ | $T_{v3}$ | $T_{c1}$ | $T_{c2}$ | $T_1$ | $T_2$ | $T_3$ | $T_4$ | $T_5$ | $T_6$ | $T_7$ | $T_8$ | $T_9$ | $T_{10}$ | $T_7$ | $T_8$ | $T_9$ |
| Mechanical Cooling | 90 | 68 | 52 | 77 | 55.5 | 60 | 60 | 63 | 41 | 45 | 45 | 85 | 95 | – | – | 85 | 95 | – |
|  |  | 68 | 56 | 79 | 54.5 | 60 | 60 | 63 | 49 | 51 | 51 | 82 | 95 | – | – | 82 | 90 | – |
|  | 80 | 67 | 52 | 77 | 55.5 | 60 | 60 | 63 | 42 | 45 | 45 | 82 | 91 | – | – | 82 | 91 | – |
|  |  | 67 | 56 | 79 | 54.5 | 60 | 60 | 68 | 50 | 51 | 51 | 78 | 85 | – | – | 78 | 85 | – |
|  | 70 | 63 | 51 | 77 | 55.5 | 60 | 60 | 62 | 42 | 45 | 45 | 71 | 79 | 78 | 77 | 80 | 88 | – |
|  |  | 63 | 55 | 79 | 54.5 | 60 | 60 | 62 | 50 | 51 | 51 | 73 | 79 | 78 | 77 | 75 | 82 | – |
|  | 60 | 60 | 49 | 77 | 55.5 | 60 | 60 | 60 | 43 | 45 | 45 | 80 | 86 | 85 | 84 | 75 | 82 | – |
|  |  | 60 | 52 | 79 | 54.5 | 60 | 60 | 60 | 51 | 51 | 51 | 82 | 86 | 85 | 84 | 70 | 76 | – |
|  | 50 | 58 | 47 | 77 | 55.5 | 60 | 60 | 59 | 44 | 45 | 45 | 89 | 93 | 92 | 91 | 70 | 76 | – |
|  |  | 58 | 51 | 79 | 54.5 | 60 | 60 | 59 | 51 | 51 | 51 | 90 | 93 | 92 | 91 | 70 | 75 | – |
|  | 40 | 56 | 47 | 77 | 55.5 | 60 | 60 | 59 | 44 | 45 | 45 | 97 | 100 | 99 | 98 | 70 | 75 | – |
|  |  | 56 | 51 | 79 | 54.5 | 60 | 60 | 59 | 51 | 52 | 52 | 98 | 100 | 99 | 98 | 70 | 75 | – |
|  | 30 | 54 | 46 | 77 | 55.5 | 60 | 60 | 58 | 45 | 45 | 45 | 105 | 107 | 106 | 105 | 70 | 75 | – |
|  |  | 54 | 51 | 79 | 54.5 | 60 | 60 | 58 | 52 | 52 | 52 | 105 | 107 | 106 | 105 | 70 | 75 | – |
| Tower Cooling | 50 |  |  |  |  |  |  |  |  |  |  |  |  |  |  |  |  |  |
|  |  | 58 | 58 | 79 | 54.5 | 60 | 60 | 59 | 59 | 58 | 51 | 48 | – | 51 | 91 |  |  |  |
|  | 40 | 56 | 57 | 77 | 55.5 | 60 | 60 | 59 | 59 | 56 | 45 | 40 | – | 45 | 98 |  |  |  |
|  |  | 56 | 57 | 79 | 54.5 | 60 | 60 | 59 | 59 | 57 | 52 | 48 | – | 51 | 98 |  |  |  |
|  | 30 | 54 | 55 | 77 | 55.5 | 60 | 60 | 58 | 58 | 54 | 45 | 40 | – | 46 | 105 |  |  |  |
|  |  | 54 | 55 | 79 | 54.5 | 60 | 60 | 58 | 58 | 56 | 52 | 48 | – | 51 | 105 |  |  |  |
|  | 20 | 52 | 54 | 77 | 55.5 | 60 | 60 | 57 | 57 | 52 | 46 | 41 | – | 46 | 112 |  |  |  |
|  |  | 52 | 54 | 79 | 54.5 | 60 | 60 | 57 | 57 | 54 | 52 | 48 | – | 51 | 112 |  |  |  |
|  | 10 | 50 | 53 | 77 | 55.5 | 60 | 60 | 57 | 57 | 50 | 46 | 41 | – | 46 | 119 |  |  |  |
|  |  | 52 | 54 | 79 | 54.5 | 60 | 62 | 58 | 58 | 52 | 52 | – | – | – | 119 |  |  |  |
|  | 0 | 49 | 52 | 77 | 55.5 | 60 | 60 | 56 | 56 | 49 | 46 | 41 | – | 46 | 126 |  |  |  |
|  |  | 52 | 54 | 79 | 54.5 | 60 | 64 | 58 | 58 | 52 | 52 | – | – | – | 126 |  |  |  |
|  | -10 | 47 | 51 | 77 | 55.5 | 60 | 60 | 55 | 55 | 47 | 46 | 41 | – | 46 | 133 |  |  |  |
|  |  | 52 | 54 | 79 | 54.5 | 60 | 66 | 59 | 59 | 52 | 52 | – | – | – | 133 |  |  |  |
|  | -20 | 47 | 51 | 77 | 55.5 | 60 | 62 | 55 | 55 | 46 | 46 | – | – | – | 140 |  |  |  |
|  |  | 52 | 54 | 79 | 54.5 | 60 | 68 | 60 | 60 | 52 | 52 | – | – | – | 140 |  |  |  |
|  | -30 | 47 | 51 | 77 | 55.5 | 60 | 64 | 55 | 55 | 46 | 46 | – | – | – | 148 |  |  |  |
|  |  | 52 | 54 | 79 | 54.5 | 60 | 70 | 60 | 60 | 52 | 52 | – | – | – | 148 |  |  |  |

FIG. 10     TEMPERATURE TRAVERSE (of Dry Bulb)    Key: High Load / Low Load

FIG. 11

OPERATING SEQUENCE CHART

| ITEM | | | POSITIVE FABRIC TRANSMISSION TEMP. 100°F – 74°F. | HEAT RECLAIM ZONE TEMP. 74°F – 40°F ± 10°F. | FREE COOLING ZONE TEMP 40±10°F – 5±15°F. | HEATING ONLY ZONE TEMP 5±15°F – -30±10°F. |
|---|---|---|---|---|---|---|
| T$_C$ CHILLED WATER RETURN LINE | | | HOLDS MIXED CHILLED WATER AT ±60°F BY OPERATING (V) ON CHILLER | DITTO (100°F TO 74°F) | HOLD MIXED CHILLED WATER AT ± 60°F BY OPERATING (M2) | HOLD MIXED CHILLED WATER AT 60°F BY OPERATING (V2) |
| T$_R$ MASTERED BY OUTDOOR STAT | | | IDLE | ESTABLISHING RADIATION SCHEDULE BY CONTROLLING V1 & IF NECESSARY V1 | ESTABLISHING RADIATION SCHEDULE BY CONTROLLING (V1) | DITTO (40° – 5°F) |
| H REVERSE ACTING DURING SUMMER / WINTER | | | HOLD 50% RH BY OPERATING F & BYPASS DAMPER (M1)-DEHUMIDIFY | DITTO (100°F TO 74°F) | HOLD 35% RH BY OPERATING F & BYPASS DAMPER (M1) | DITTO (40° – 5°F) |
| PUMPS | RADIATION | (32) | OFF | ON | ON | ON |
| | CONDENSER | (220) | ON (OCCUPIED PERIODS) | ON (OCCUPIED PERIODS) | ON (OCCUPIED PERIODS) | OFF |
| | CHILLED WATER | (170) (172) | ON (OCCUPIED PERIODS) | ON | ON | ON |
| CHILLER | | (190) | ACTIVE (OCCUPIED PERIODS) | ACTIVE (OCCUPIED PERIODS) | INACTIVE | INACTIVE |
| HEATERS | RADIATION | (30) | INACTIVE | INACTIVE EXCEPT AT LOWER END OF RANGE FOR TOPPING | ACTIVE | ACTIVE |
| | CHILLED WATER | (196) | INACTIVE | INACTIVE | INACTIVE | ACTIVE |
| WATER TOWER FAN | | (210) | ACTIVE (OCCUPIED PERIODS) | ACTIVE (OCC. PERIODS ASSIST RE-CLAIM HTG.) | ACTIVE (OCCUPIED PERIODS) | INACTIVE |
| CONVERTOR BYPASSES | RADIATION | (47) | CLOSED | CLOSED | OPEN | OPEN |
| | CONDENSER | (232) | OPEN | CLOSED | CLOSED | CLOSED |
| | CHILLED WATER | (176) | OPEN | OPEN | CLOSED | CLOSED |

FIG. 12.

AIR CONDITIONING METHOD AND SYSTEM

This is a continuation of application Ser. No. 237,413 filed Mar. 23, 1972 now abandoned.

FIELD OF INVENTION

This invention relates to an improved method of and system for air conditioning buildings. More particularly, this invention relates to an improved method of and system for air conditioning multi-storey buildings such as office buildings, employing a novel compartmentalization system of air handling.

BACKGROUND

Modern day multi-storey buildings have generally been considered to require sophisticated air conditioning systems to meet the various needs and requirements of occupants at various locations throughout the building. The peripheral areas of such buildings usually present a varying heating-cooling load at different times during the day and year depending on ambient temperature conditions and solar heat load, whereas the interior core area usually requires cooling the year round. A large part of the heat load at the periphery of the building is due to solar heat gain which can vary significantly during a single day and from day to day, particularly in areas with southern exposures. In view of the different conditions in the peripheral areas and interior core area of multi-storey buildings, it has been common to provide a separate air distribution system for these two areas, providing a constant supply of air to the particular areas at varying temperatures to meet the varying load conditions.

Systems which have been used in the past at the perimeter involve three basic categories; all air, sometimes known as "dual duct" or "terminal reheat" systems; all water, sometimes known as "fan-coil", and air-water; sometimes known as "induction". Systems which have been used in the interior involve principally cool ducted air at constant volume with reheat control.

The majority of prior systems have been arranged with remote fan rooms which supply conditioned air directly to the spaces to be conditioned or to terminal units within such spaces. These systems employ vertical conditioned air duct and return air duct risers and although they allow centralized maintenance of fan equipment, they have introduced a number of problems such as potential recirculation of toxic gases from the scene of a fire to other parts of the building. Deaths can occur when the contamination exceeds 1 percent of the density of smoke at the fire source. Some of these casualties have been traced to smoke spread by fans and vertical duct risers connecting floors.

Other problems with previous systems involving remote fan rooms and vertical duct risers include noise potential due to riser take-off and the use of heavy air pressures in operating the remote fans, and include the loss of space often up to 6 percent of the building gross for air handling equipment and 4 percent for duct shafts. Further, most air conditioned buildings are forced by the nature of the centralized, remote fan room system of handling air to condition the entire building during periods of "after hours" or "odd hours" work of certain tenants on specific floors and this accommodation of the tenants detracts greatly from the operating economy of the system. The majority of systems also depend upon the use of variable outside air ratios for direct free cooling of the building interior. This concept has introduced potential problems such as coil freezing, mixed air stratification heavy dirt loading on filters and the requirement for very large louver areas in the fan rooms.

Further difficulties with typical systems arise at the perimeter of the building where it is conventional to deliver air at the window sill from very bulky enclosures of terminal units such as air-induction or fan coil units. As well as taking up 10 to 30 inches of usable space and detracting from room decor, these enclosures are a source of noise leakage between offices and require regular maintenance within tenant space for filters, nozzles and fan lubrication. Cooling potential of such equipment is often reduced critically by appearance drapes hanging in front of the enclosure.

More recent air conditioning systems have employed a more economical basis of air distribution whereby the supply of cool air is varied in place of reheating a constant volume of cool air in order to maintain temperature control. This system eliminates reheat energy while also reducing energy for cooling and air handling. Such systems are called "Variable Air Volume" (VAV) and it is believed that in their most logical application they are installed with a supply of conditioned cool air along with standing radiation at the perimeter. Such application eliminates the need for separate air handling systems for perimeters and interior space, the single zone Variable Air Volume being sized to absorb all solar load and internal load. The perimeter radiation is sized to neutralize only wall fabric heat loss. The cost for the additional overhead air is a fraction of the premium for the bulky fan coil or induction perimeter.

While a Variable Air Volume system with air handling units arranged on each floor may embody a "static" life safety provision and possible static smoke dispersal control, it generally fails to provide a "dynamic" control through an ability to pressurize vital stair and elevator exit routes from the building. Such a provision is of importance in modern day multi-storey buildings in view of the limitations of normal fire fighting equipment in combatting fires which break out on upper floors of the building and panic caused by smoke dispersal through out the building. Further, a most serious problem with present day air handling units arranged on each floor and which are directly connected to the false ceiling for return air has been muffling the noise of the fan. The provision of a return air duct system above the false ceiling increases the overall costs of a building in necessitating a deeper false ceiling plenum to permit cross-overs between the duct work. Sound control can be added at the boundary of a fan utility room but this correction must rely on field workmanship to such an extent as to be impractical when trying to meet the usual criteria of NC-40 alongside the fan room and NC-35 in the perimeter area or executive office space area on a floor. On-floor fan units of the size necessary to deal with typical office floors of 10,000 sq. ft. or more can not be silenced with simple field applied sound silencers in the inlet and outlet ducts. Even the casing of such equipment emanates enough noise to exceed the usual noise criterion noted above.

Present day HVAC systems often have sophisticated and complicated automatic control systems, the complexities of which increase as the need for local control arises. Often the design of such control systems falls beyond the comprehension of the average building system operator with resulting peril for the equipment and the beneficiaries of the system. Moreover, such control systems have initial high cost and require regular inspection and maintenance to maintain the HVAC system functional.

SUMMARY OF THE INVENTION

Accordingly, it is an object of the present invention to provide an improved method and system for air conditioning multi-storey buildings which overcome the above-noted disadvantages of prior art systems and which provide a less expensive, less complicated and more easily serviced means of conditioning multi-storey buildings than has heretofore been employed.

It is an object of this invention to provide a compartmentalization system of air-conditioning a building utilizing single zone variable air volume with perimeter radiation in association with specialized compartment air units located in fan closets on each floor of the building to be conditioned.

It is also an object of the invention to provide such a compartmentalization system of air conditioning a building wherein not only static smoke dispersal control is present but also dynamic control is provided through the ability of the system to pressurize vital stair and elevator exit routes from the building.

It is also an object of this invention to provide such a compartmentalization system wherein a realistic solution to noise emanation from fan units and riser take-offs is achieved by providing a specially designed factory-made presilenced unit for operation in a fan closet alongside NC-40, the unit being sound controlled in such a way that even casing noise is suppressed. Also provided is an especially designed wall fin panel providing sound barriers at wall partition points.

It is a further object of this invention to provide such a compartmentalization system of air handling which avoids the space consumption of shafts and fan rooms in previous systems, the savings in space resulting, in part, from a special closet-type design of the on-floor compartment units permitting all maintenance from one side and from a novel design of a thin finned perimeter radiation panel.

It is still a further object to provide such a compartmentalization system of air handling wherein all compartment air handling closets in the building are fed with a specific supply of preconditioned fresh air or ventilation air from a remote source in the building: Ventilation air is admitted to the closets in specific quantities from a ventilation supply air shaft which are supplied with fresh air preconditioned as to temperature and humidity. There, in the closets, it must mix with recirculated air before moving in equal parts to all conditioned areas fed by the VAV system. The supply of ventilation air can be easily adjusted to a correct and constant air quantity to each floor by means of dampers between the shaft and closets. Rebalancing to suit other exhaust rates in the future may accordingly be handled with equal ease. Operation of specific floors after hours can be managed without ventilating other floors since the dampers between the ventilation shaft and compartment units can be equipped to close down as individual floor units are shut down for the night. The fresh air unit may also be variable in capacity and can be scheduled to operate at constant shaft air pressure so that ventilation can be continued at normal quantity to any late operating on-floor system.

It is still a further object to provide a control system for such compartmentalization system with self compensating features having accuracy of control of the water circuits for a whole building, with one thermostat for each of the hot water and chilled water circuits, and one humidistat. No control is required at the compartment units themselves, and air zone control is handled on the basis of one thermostat for each point of VAV control. The chilled water is scheduled by allowing a single sensor located in the chilled water return line before the chiller to operate the capacity control on the chiller thereby optimizing the energy input to the chiller. The same sensor may also control the introduction of heating to the chilled water circuit through a heating convertor as the need for cooling declines. All unwanted heat is rejected through a water cooling tower at all times of the year and the same sensor may also control inlet dampers on a water tower fan thereby controlling the water chilling during free cooling provided by the water tower when the outside temperature is low enough, generally below 40° F or thereabouts, to permit it to continue as a source of chilled water. A single humidistat in a sanitary exhaust of the building, whereby a good average of building humidity is obtained, controls the face and bypass damper of the sprayed coil of the ventilation unit thereby controlling the overall humidification of the building by means of the ventilation air supply.

Other features and advantages of my invention will become apparent from an appreciation of the following preferred embodiment of my system as depicted in the following drawings wherein:

FIG. 10 is a representative temperature traverse relating to the circuitry shown in FIG. 9;

FIG. 12 is an operating sequence chart of my system.

PREFERRED EMBODIMENT

Figure 1:
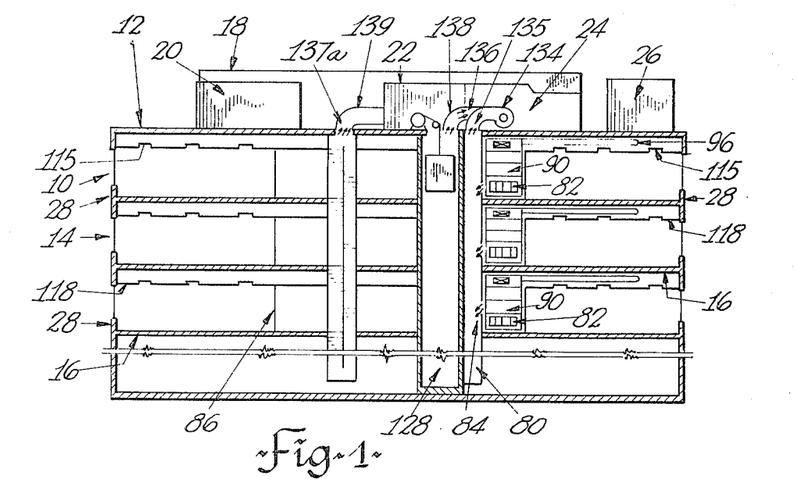
FIG. 1 is a diagrammatic cross-sectional view of a building incorporating my compartmentalized air conditioning system.

Now with particular reference to the drawings which exemplify the preferred embodiment of my invention, a multi-storey building 10, shown partially and diagrammatically in FIG. 1 has roof 12, exterior walls or fabric 14 which includes exterior glass areas of the building, and floors 16. Apparatus penthouse 18 on roof 12 houses various schematically shown apparatuses and more particularly houses conventional hot water generating means 20, elevator hoist equipment 22 and ventilation and humidity control apparatus 24. A cooling tower, winterized for year round operation and more fully referred to herein, is schematically shown at 26.

My invention utilizes a variable air volume with perimeter radiation system for air conditioning building 10. Heating of the building comprises passing hot water, generated and scheduled by conventional means to a temperature appropriate for ambient condition through standing perimeter radiation units. The heating through these units solely compensates for fabric heat losses flowing outwardly of the building during the cooler periods of the year. As part of my preferred embodiment I include a heat reclaim sub-system even though it will be appreciated as will become more apparent herein, that my invention is not to be limited by this inclusion, except as set forth in the claims hereto.

Figure 9:
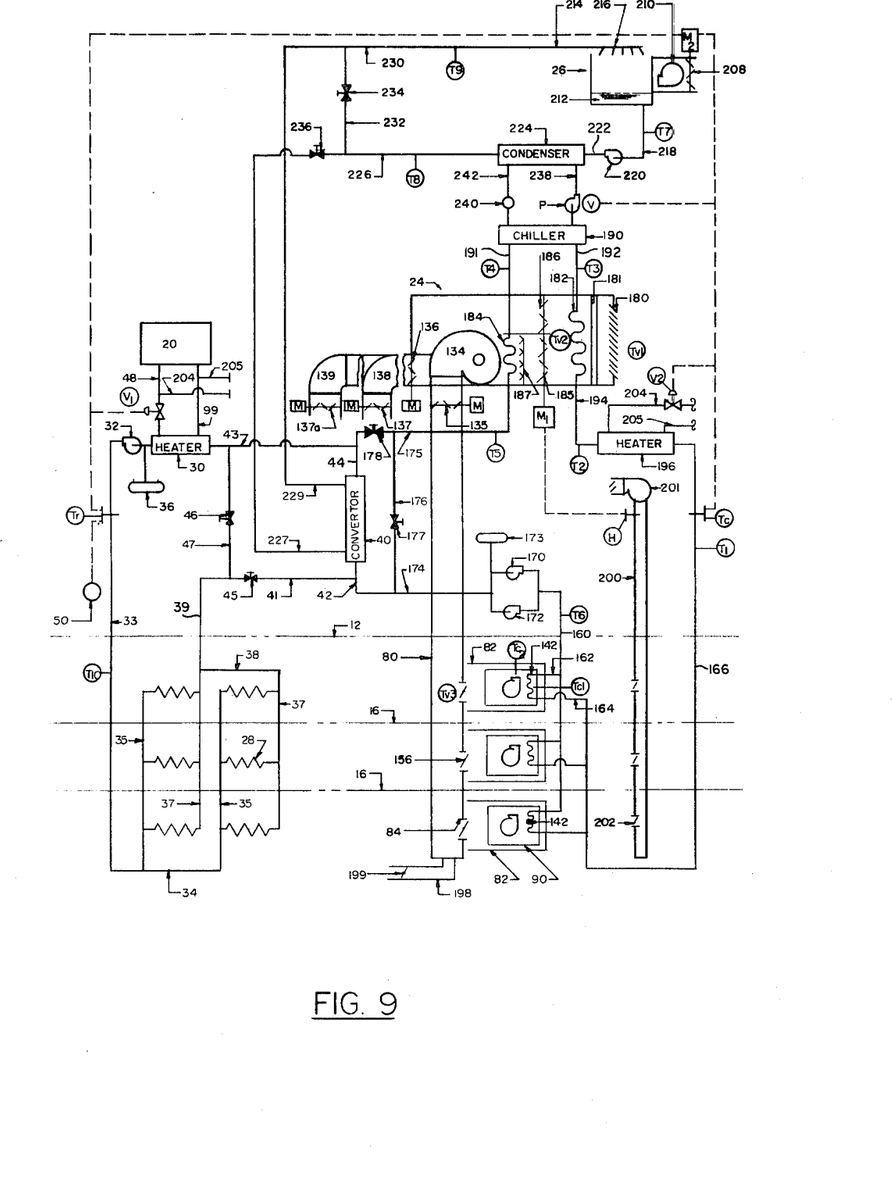
FIG. 9 is a schematic view of the equipment, water circuits and control arrangement of the compartmentization system.

During the late spring, summer and early fall periods, little or no fabric heat loss will occur and consequently the perimeter heating sub-system will be idle or will be on standby during these periods. During heating periods, hot water is circulated through thin finned standing radiation units 28 located at the outside walls 14 on each floor 16. FIG. 9 schematically illustrates the piping circuitry for the heating sub-system wherein perimeter radiation water, raised to an appropriate temperature in heater 30, is pumped by means of radiation water pump 32 through radiation supply line 33 and 34 to radiation risers 35. Expansion tank 36 provides for fluid expansion in the closed hot water circuit. The piping of the radiation water circuit is laid out in a regular vertical grid so that all circuits are reverse returned for equal friction and elimination of water balance. Accordingly, risers 35 are fed so that the slightly cooler water at the end of the run will correspond to the lesser requirement of heat at the top of the building of that run. Perimeter radiation units 28 on each floor 16 (represented in FIG. 9 by a line) are connected to risers 35 and are in heat exchange relationship with air at the outside walls of building 10. Units 28 are connected to vertical return risers 37 which in turn are each connected through common line 38 to return line 39. As my illustrated preferred embodiment includes a heat reclaim sub-system, return line 39 is connected to convertor 40 through line 41 and converter line 42. Radiation water return line 43 is connected to convertor line 44 and returns water to heater 30 for temperature rescheduling, if necessary. During heat reclaim, operation valve 45 in line 41 is open and radiation water bypass valve 46 in bypass line 47 is closed thereby directing return radiation water through convertor 40 before returning to pass through heater 30. As will become more fully appreciated hereinafter, during non-heat relcaim, operation valve 45 in line 41 is closed and bypass valve 46 in bypass line 47 is open in order to bypass convertor 40. Moreover, if no heat reclaim cycle is employed (heat reclaim, although generally employed in heating and air conditioning systems is recognized as an optional sub-system) then return radiation water would pass directly from return line 39 to heater 30 for temperature rescheduling therein and in this case lines 41 and 43 would not be present.

Although only three floors are depicted in FIG. 9, it will be appreciated that this hot water circuit is generally adaptable to any number of floors. However, because of infiltration effects on tall buildings, it will be preferred as will be appreciated by those skilled in the art, to pipe the radiation units for a different radiation schedule on groupings of not more than 20 floors. Moreover, only two vertical grids are shown, but risers 35 will generally be run at centers of from 20 to 30 feet. Accordingly it will be appreciated that more than two vertical grids will be present in most installations in multi-storey buildings. Although only one radiation water pump 32 is shown, it will be appreciated that two pumps in parallel may be employed so that if one pump mechanically fails, the twin pump may continue to maintain adequate water velocity in the radiation units and through the piping circuit. The pumps would be backed with emergency power.

It is well known that the rate of heat loss through the fabric of a building is directly proportional to the temperature difference between outside or ambient temperature and the inside temperature of a building. The scheduling of radiation water to suit outside temperature may be done by any of the methods which are well known in the art. In FIG. 9, hot water generating means 20 is connected to heater 30 by feed line 48 and return line 49. Thermostatically controlled valve $V_1$ in feed line 48 controls the flow of hot water from means 20 through heater 30 which water passes in heat exchange relationship with the radiation water within heater 30. The temperature of the radiation water for heating is accordingly controlled by a single thermostat $T_R$ located in supply line 33 and master controlled by a single outdoor temperature stat 50 suitably located in known fashion.

Figures 2, 5:
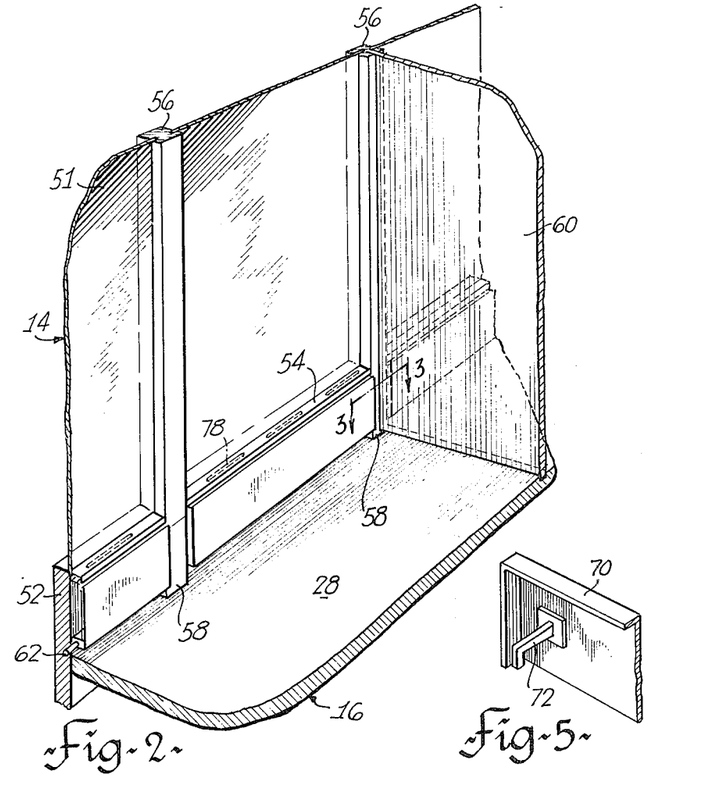
FIG. 2 is a partial view of the peripheral wall of the building in FIG. 1 particularly illustrating the perimeter radiation.
FIG. 5 is an enlarged view of part of the inside of the panels showing a hook.
Figure 3:
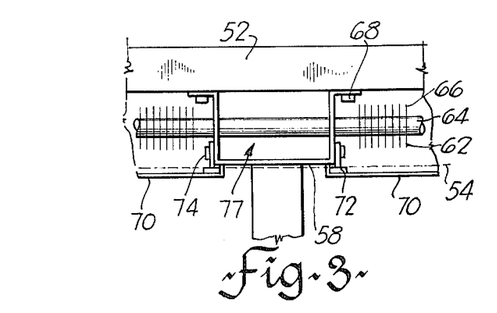
FIG. 3 is an enlarged sectional view taken at lines 3—3 of FIG. 2 and illustrating part of the perimeter radiation unit.
Figure 4:
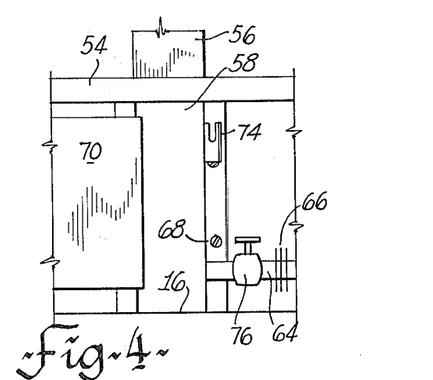
FIG. 4 is an enlarged view of a radiation mullion with one of the panels removed.

FIGS. 2 to 5 inclusive show a preferred construction of the perimeter radiation units 28. FIG. 2 shown a partial view of a perimeter office wherein fabric 14 includes windows 51 and outer structural wall 52. Windows 51, preferably double glazed, are secured into place in known fashion to ledge 54 and window mullions 56. Radiation mullions 58 are disposed in direct vertical alignment with window mullions 56, and are used to incorporate sound barrier means between adjacent offices while at the same time providing for a flat ended partition 60 between the offices. In the past, most office partitions have required a special notch to be cut to fit against a more bulky form of perimeter radiation enclosure. The preferred wallfin radiation unit 62 has a depth of about three to six inches which will suffice in most cases even where a heat reclaim cycle is employed, the deeper unit being required for heat relcaim because of the lower available water temperatures through the condensing water. With this depth of enclosure, it will be appreciated that the wallfin radiation unit 62 may be generally incorporated under the ledge 54 thereby conserving space for furniture arrangement and the draping from ceiling to floor of its fenestration. The wallfin unit 62 includes hot water pipe 64 and a plurality of thin finned elements 66 secured thereto in known fashion and in heat exchange relationship to the air. Pipe 64 as shown in FIGS. 3 and 4 is supported by radiation mullion 58, and mullion 58 is secured to structural wall 52 under ledge 54 by bolt means 68. However, it will be appreciated that pipe 64 could be supported by a separate bracket bolted to wall 52 and located within mullion 58. Panels 70 with hooks 72 on the inside (FIG. 5) are hung on the radiation mullions 58 through hook supports 74 secured to the side of the mullions 58 and form the wall finish under the window. The panels also give easy and simplified access to isolating valves such as valve 76 used with the radiation units, it being appreciated that isolating valves are used with the perimeter radiation system in known fashion, even although for reasons of clarity they have not been shown in the hot water circuitry of FIG. 9. Sound proofing material may easily be incorporated in space 77 in mullions 58 where required to provide, in conjunction with the mullion, an excellent sound barrier between offices. Sufficient space is provided below and above pannels 70 to permit good air connection and heat exchange. Slots 78 in the ledge 54 are optional and may be used as desired in substitution for the space above panel 70 or in addition to it. Although not shown, it should be appreciated that a solar or venetion blind will be appropriately hung against or closely adjacent glazed glass 51. Some defrosting of the glass, if necessary, is accordingly possible if the window sill slots 78 are between the glass and the blind. For double glazed units it is recommended by fenestration suppliers that the blind be located between the glass and radition.

It will be appreciated by those skilled in the art that the depth of radiation unit 28 selected will depend on the building heating requirements per linear foot of wallfin, and whether a heat reclaim cycle is employed. Moreover, it will be appreciated that two wallfin elements 62 may be vertically or horizontally stacked in parallel to provide greater heat exchange surfaces. Further the height of the panels 70 or their "stack" may vary depending on the architectural requirements in conjunction with the heating requirements. For example, with 180° F generated hot water available, a 3 inch depth of the radiation unit would generally suffice whereas, with a heat reclaim cycle, a larger wallfin element with an overall unit depth of 6 inches would generally be required in order to provide for fabric loss at condensing water temperatures of 100° F, or thereabouts. Field installation costs of the radiation sub-system may be reduced by prefabricating the connections to the pipe risers 35 leaving only butt jointing of the risers and connection of prewelded branch fittings to the radiation elements in the field. Insulation of the vertical risers is unnecessary and indeed not advisable since the risers themselves can radiate heat in the area of perimeter unit take-off. Since the perimeter radiation heating provides the sole heating means for building 10, it will be appreciated that accurate determination of heat loss through building fabric 14 (and roof 12) is important, and involves not only assessing wall infiltration of the various materials making up the fabric 14 (and roof 12), but should take into account the varying nature of the joints in building construction and allow for the varying degrees of workmanship in such constructions. Accordingly, it will be appreciated that a margin of safety should be considered in designing the heating system to compensate for fabric heat loss and the installed radiation capacity should perhaps be up to 15 to 20 percent greater than the calculated heat loss. If the building should match or improve upon the wall heat transfer criterion, the oversized radiations can use a schedule with less hot water to compensate the heat loss.

As the fabric heat losses of the building are compensated by the heating system, all the interior heat gain resulting from the sun, occupants, lighting fixtures and miscellaneous electrical equipment becomes a cooling load to be offset by the air cooling system. Ventilation and humidity control means 24 is located on roof 12 and serves to supply conditioned fresh air to vertical air riser 80 as seen in FIG. 1. Riser 80 in turn serves to supply conditioned fresh air to each floor fan closet 82 through damperred inlet 84. At least one fan closet 82 is located on each floor to be conditioned, and is preferably located adjacent to generally non-rentable service area 86 on the floor, which areamay include elevator shafts, stairs, washrooms and utility rooms.

Figure 6:
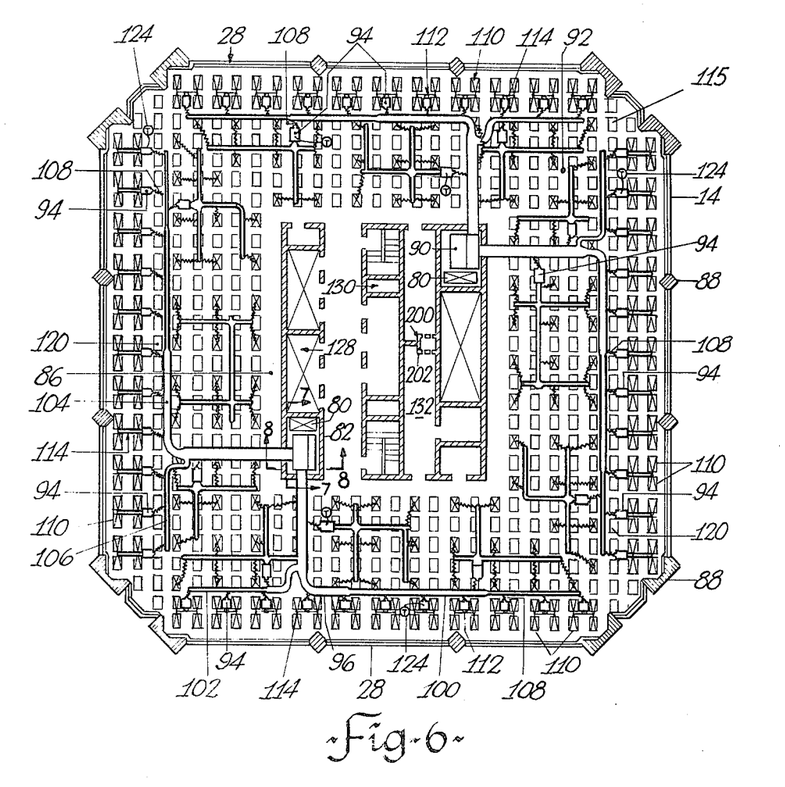
FIG. 6 is a diagrammatic plan view of a typical floor of the building in FIG. 1 particularly illustrating air distribution on the floor, appearing with FIG. 1.

FIG. 6 diagrammatically illustrates a plan view of the single zone variable volume air terminal cooling system which radiates out from fan closet 82 on a typical floor of the building which has support columns 88. FIG. 6 actually shows two fan closets 82 adjacent service area 86, each with identical duct work, and each fresh air shaft 80 would be fed with preconditioned fresh air from unit 24. It will be appreciated however that a single fan closet 82 may be employed depending on the size of the building and cooling load. Within each fan closet 82 is an air handling compartment unit 90 which serves to supply through suitable overhead duct work, cool air to occupied space 92 at a temperature between 53° and 58° F., preferably about 55° F. With a single zone variable air volume system, the necessary volume of air to match the interior heat gain is regulated by the thermostatic action of "constant pressure, variable volume air terminals" of a type commonly available today. These terminals 94 are located at any interval demanded by design requirements and are fed with cool air from the closet or compartment units 90. The terminals 94 may be selected from among a number of products commercially available today and should preferably incorporate constant outlet pressure control, air shutoff to within 10% of the normal capacity and low noise level for normal operating pressure of 1 to 3 inches static pressure.

As illustrated in FIG. 6 compartment units 90 each serve two main ducts 96 and 98, each of which serves two intermediate ducts 100, 102 and 104, 106 respectively. All of the supply ducting can be arranged to avoid cross over clearance. Variable air volume terminals 94 are supplied through terminal ducts 108 with conditioned air from the intermediate ducts. Terminals 94 control the volume of cool air supplied to air diffusers 110 through diffuser supply ducts 112 and diffuser inlet ducts 114. Diffusers 110 are of the overhead type and are preferably associated with light troffers 115 in a manner which is well known in the art. The duct work just referred to is located in space or plenum 116 formed between false ceiling 118 (FIGS. 1, 7 and 8) and the floor 16 thereabove. This space or plenum 116 also serves as a return for the return air leaving the various rooms on the floor through suitably located exhaust grills 120 which can be located adjacent to or in conjunction with other light troffers (not shown) as will be appreciated by those skilled in this art. It will be further appreciated that a standarization of the duct work is advantageously employable with the variable volume air distribution system as exhibited by the ductwork in FIG. 6 and a generally acceptable 15 inch thruway to accomodate four standard duct sizes of 12 inch depth each is all that is required.

Each of the terminals 94 has a thermostatic control device 124 which is suitably located in a room to be conditioned and controls the volume of cool air entering the room in response to changes in the cooling load therein. Compartment units 90 are sized to provide enough cool air to compensate for solar heat gain at the exterior wall 14 (and roof 12 where applicable) of the building and all interior heat gains such as lights, occupants, miscellaneous electric loads and any heat gain through fabric transmission. When more than one solar exposure is served by one unit 90, the capacity is selected to match only the greatest simultaneous load and not the sum of all load peaks. For the sake of simplicity and lower maintenance cost, the addition of zone or individual thermostatic valves for the perimeter radiation are not preferred. Since the variable air volume air terminals 94 for perimeter offices are sized to provide cool air for maximum solar heat gain, there is no need to reduce the heat input from the wallfin during periods of direct sunshine. Introduction of control for this purpose will cost much more in maintenance and amortization or original cost than fuel saved. Furthermore, if the air terminals are forced to supply maximum air during sunny intervals, the affected offices will benefit from an excellent air flushing rate.

Serving area 86 on each floor of the building includes a lobby 126, at least one elevator shaft 128 which extends vertically from elevator hoist equipment 22, at least one stairwell 130 and at least one washroom 132. During normal air handling operation, ventilation unit fan 134 (FIG. 1) supplies conditioned fresh air to the various floors of the building through risers 80. However in the event of a fire on one or more floors of the buildings, motorized dampers 135, 136, 137 and 137a, responsive to smoke sensors (not shown) on each floor of the building or through manual switch operation, redirect the ventilation air through ducts 138 and 139 which are connected to elevator shaft 128 and stairwell 130 respectively to sufficiently pressurize these access and exit routes and thereby prevent smoke infiltration. This dynamic smoke control through pressurization by the ventilation air handling unit enables firemen to have smoke free elevator access in view of the height of modern day buildings and the limitations of fire fighting equipment. The occupants of the building will also have a smoke free exit means from the building. Of course it will be appreciated that more than one elevator shaft and stairwell may be pressurized by the redirection of the ventilation air, thereby providing more smoke free exit means from the buildings.

Figure 7:
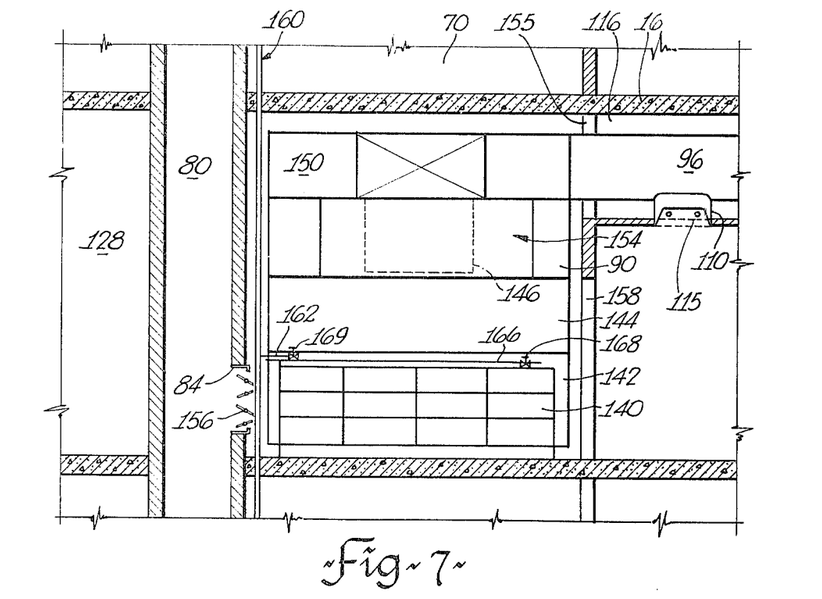
FIG. 7 is an enlarged vertical section of a closet and compartment taken along line 7—7 of FIG. 6.
Figure 8:
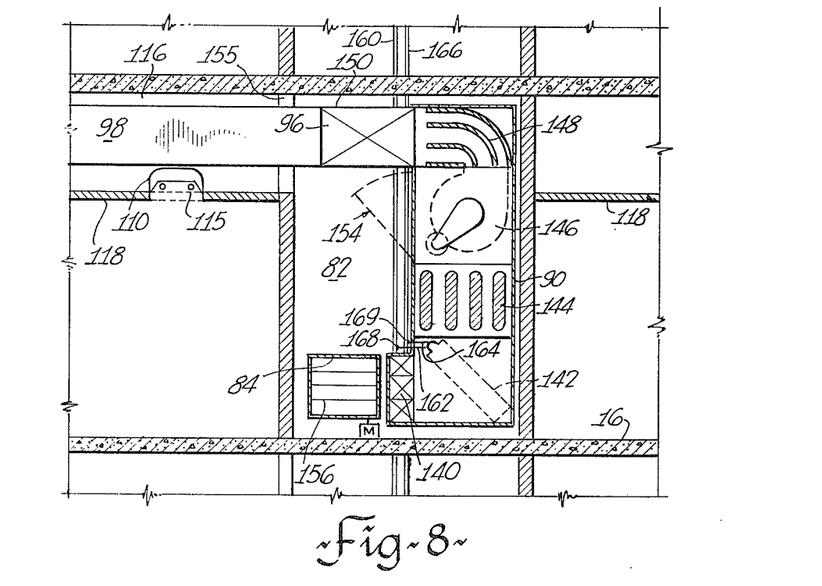
FIG. 8 is a vertical section of the closet and compartment unit taken along line 8—8 of FIG. 6.

FIGS. 7 and 8 illustrate a fan closet 82 and a compartment unit 90. Closet 82 and 90 are interrelated in design in that closet 82 is designed to house only unit 90. Unit 90 is designed to provide complete maintenance access to the unit within the closet 82 from one side, thereby eliminating the need for access space on the other three sides of the unit 90. Unit 90 includes media type filters 140, water cooling coils 142, sound trap 144, fan 146 driven in conventional manner by an electric motor 147, sound trap 148 and outlet plenum 150 which provides a take-off for ducts 96 and 98. Access space 152 within closet 82 permits maintenance of unit 90 to be carried out from one front-side location. Door 154, shown in hidden lines, in the front of unit 90 permits ready access to fan 146 and removal of media type filters 140 permits access to cooling coils 142. The various components of unit 90 are generally prefabricated and may be field assembled within closet space 82. Important aspects of unit 90 are its presilencing as a unit and its one-sided maintenance. The presilencing of the unit by its manufacturer to a specified contracted noise criterion such as NC-40 on the other side of fan closet 82 partition and open to its false ceiling plenum 116, eliminates the difficulties and costs of silencing the units and ductwork in the field. Any maintenace of the units 90 may be conducted entirely from one side within closet 82. In other words, maintenance of units 90 may be carried out from one side of the unit and entirely within the space of the mixing plenum 152 and accordingly an increase in usable floor space is provided throughout the building. Sufficient space such as 3 or 4 inches is provided between the sides of the unit and closet walls to eliminate any sound couple and the access space may be 4 or 5 feet in depth. The capacity for unit 90 preferably ranges from 8000 to 20,000 CFM and the number of units per floor will depend on the total conditioning requirements of the floor. It will be appreciated that in special cases the unit on one floor may be sized differently than the unit on another floor although generally in conditioning multi-storey office buildings the units will be standardized throughout the floors being conditioned.

Access space 152 also provides a mixing plenum for mixing recirculated air entering closet 82 from space 116 through wall opening 155 and preconditioned ventilation air entering closet 82 through damper controlled ventilation air inlet 84. The quantity of preconditioned air entering fan closet 82 from ventilation shaft 80 is controlled by dampers 156. Dampers 156 are preset to permit a specified quantity of preconditioned fresh air to enter closet 82 and the quantity equals or exceeds the exhaust from each floor, the set condition remaining fixed until the rate of exhaust is changed. Building and floor by floor pressurization may accordingly be controlled. The dampers 156 as shown may be motorized by motor M to shut completely when unit 90 is shut down but reopen to their set condition when unit 90 is restarted. Controlling dampers 156 in this manner enables after hours operation on specific floors to be managed without ventilating floors wherein the floor unit is shut down for the night. In order to enable the fan 134 to operate at reduced capacity and thereby optimize fan energy, it will be appreciated that ventilation unit fan 134 may be equipped with volume control which is responsive to a pressurestat (not shown) located in riser 80 below dampers 135 for maintaining a constant riser air pressure. Accordingly, at night as several floors are shut down, the ventilation fan will reduce its speed to maintain constant pressure in riser 80, but nevertheless provide ventilation fresh air to those floors requiring after hours operation. The ventilation fan speed can be varied with a motorized variable pitch arrangement on the drive pulleys, with a solid state (SCR) control on the electrical input to the fan motor, or by fluid drive. Each of these means of controlling fan speed are well known and are not believed to require further explanation. In addition to optimizing fan energy of the ventilation fan unit 134, fans 146 in compartments units 90 may be provided with variable speed drives (also not shown) so that their fan energy can be optimized and operating pressure reduced for light load periods. The fan speed varies in response to a static pressure sensor (not shown) located in the unit outlet plenum 150 and may be varied in a similar fashion as the variation of ventilation unit fan 134. This volume control in order to maintain constant pressure in the outlet plenum 150 feeding the duct system permits the fans 146 to follow cool air demand from the air terminals with minimum energy and noise generation from the fan. During operation of the system, closet door 158 is closed whereby closet 82 is in communication only with return air space 116 and vertical air riser 80. Accordingly, during operation closet 82 is under slight negative pressure. Compartment units 90 need only one routine visit per year for filter change and lubrication and fan switching and performance surveillance is preferably centrally organized, for example, in the apparatus penthouse 18.

Unit 90 generates cool air with water cooling coil 142. This air comprises a mixture of recirculated air and fresh ventilation air, the quantity of the latter in the mixture being controlled through fan closet damper 156. Cooling coil 142 is continuously fed year round during operating periods with chilled water from chilled water apparatus centrally located in apparatus room 18, which apparatus will be more fully referred to herein. Chilled water supply line 160 supplies chilled water to the various floor units, conduit 162 connecting line 160 to coil 142. Chilled water after passing through coil 142, is returned to apparatus room 18 through line 164 and chilled water return line 166, line 164 connecting line 166 to coil 142. Manually operated isolation valves 168, 169 are provided in line 162 and 166 for obvious reasons.

The chilled water supply temperature is regulated to suit the cooling load in the building. Although this regulation may be accomplished from a sensor (not shown) located in the leaving air plenum 150 of one of the compartments units in the building and more particularly, the hardest working compartment unit in the building, the preferred method of centralized control is shown in FIG. 9. It will be appreciated however that in either case centralized control avoids the necessity for chilled water control valves at each unit as in conventional systems.

FIG. 9 schematically illustrates the preferred chilled water and hot water circuitry of my system. Perimeter radiation units 28 and compartment units 90 are schematically illustrated and although only three floors 16 are shown it will be appreciated that this system is adaptable to air conditioning very tall buildings including those over 50 to 60 floors, each with similar radiation and compartment units. The hot water circuitry has previously been referred to. The chilled water circuit includes chilled water supply line 160 connected to dual chilled water pumps 170, 172. Expansion tank 173 provides for fluid expansion in the closed chilled water circuit. Pumps 170 and 172 are connected to line 174 and it is preferred to include two chilled water pumps, both backed up with emergency power, so that if one pump fails, the twin pump in the dual pumping unit continues to maintain adequate water velocity in the tubes of the coils in the ventilation and humidity control unit 24 thereby preventing freezing of the ventilation precoil in winter. Line 174 is connected to convertor line 42 of convertor 40 and line 175 is connected to convertor line 44 at the other end of convertor 40 and leads from the ventilation and humidity control unit 24. Chilled water bypass 176 connects lines 174 and 175 to selectively bypass convertor 40 upon appropriate operation of chilled water bypass valve 177 and valve 178 in line 175.

Ventilation and humidity control unit 24, in addition in fan unit 134 and motorized outlet dampers 135, comprises inlet motorized dampers 180, filter media 181, first and second coils (or precoil and recoil) 182 and 184, motorized face and bypass dampers 185 and 186 respectively and recirculating water sprays 187. Coils 182 and 184 are both connected at one end to chiller 190 through lines 191, 192. The other end of the recoil 184 is connected to line 175 whereas the other end of precoil 182 is connected by line 194 to a heat convertor 196 which is in turn connected to chilled water return line 166. Ventilation inlet damper 180 and outlet damper 135 are motorized to shut down when ventilation fan 134 stops, as is common in the art. Unit 24 is of typical construction but functions to provide ventilation, pressurization and base humidity control for the building. Pressurization of building 10 is accomplished through unit 24 without the necessity of spill fans. Pressurization of a building generally results from leaving behind a residual between basic ventilation air and necessary exhaust. However it will be appreciated that often the entrance floors lack sufficient pressurization to reduce door whine and entrance draughts particularly in cold weather when the pressure profile of a tall building is most severe. By making use of static regain at the base of ventilation air riser 80 whereby pressure in the riser at this point is used to bleed air selectively to the entrance floor of the building in cold weather, door whine and entrance draughts are reduced on an automatic basis. A pressure stat (not shown) in the entrance lobby of building 10 is set to automatically control dampers 199 in pressure duct 198 which bleeds ventilation air at the bottom of riser 80 to the entrance lobby. This selective bleeding of perhaps 3 to 4 percent ventilation air for additional pressurization of the entrance lobby does not, overall, deprive the building of ventilation air. It will be appreciated that if the basic ventilation rate for the building 10 is chosen so high that the air residual provides undue summer pressurization in the entrance lobby, a compensating relief opening can be added at the top of elevator shaft 128.

Moisture in the building is controlled with face and bypass dampers 185 and 186 and sprays 187. Both dampers 185 and 186 are motorized but are operated inversely by the single damper motor M1, under the action of humidistat H which is located in the main sanitary exhaust air shaft 200 of the building before exhaust fan 201, as schematically shown in FIG. 9. Grills 202 on each floor and located as required provide exhaust to the sanitary exhaust 198. This sensing position of the humidistat H is economical, since the sensing instrument and humidity control dampers will invariably be close together, and accurate since this air stream provides the best possible average of building humidity. During summer a building tends to suffer from too much moisture whereas in winter the opposite is true, the building generally suffers from too low a moisture level. During winter, moisture is added to the ventilization air in order to maintain an overall building dew point of 45° F or therabouts which corresponds generally to a relative humidity of about 35 percent at 74° F, generally the desirable comfort conditions in the occupied spaces. As will become more apparent hereinafter, fresh air during winter is preheated to between 40° and 60° F dry bulb by the precoil 182 but this air will be below the desired building dew point of about 45° F. If air off the precoil 182 is permitted to pass through the recoil 184 which is continuously sprayed with recirculating water by sprays 187 in known fashion, the air would have a dew point above 45° F. For example, if the air off the precoil 182 is passed totally through the sprayed recoil 184, the ventilation air may reach a condition close to 55° F saturated. This will be adequate in most cases to maintain the building at up to 40 percent relative humidity for winter. Accordingly, a controlled operation of face and bypass dampers 185 and 186 by building humidistat H provides a mix of air off the precoil with air through the recoil to substantially meet the desired dew point. During summer, it is desirable to hold the building to approximately 55° F dew point since this corresponds to a relative humidity of 50 percent at a temperature of 74° F. However, as previously noted, buildings during summer tend to suffer from too much moisture as summer air generally has a moisture content greater than desirable in the building. Accordingly, a reversal of control in humidistat H is necessary since we have moister air through the bypass in summer. The reversal of control is intended to take place as a by product of switching to free cooling as winter approaches, around 35° to 40° F., and back again at the time mechanical refrigeration is initiated. When the humidity control is reversed for summer fresh air dehumidification operation, air bypasses the second coil only when the humidity is too low and accordingly, it will be noted that by preventing the relative humidity from falling too low another economy is introduced in the requirement for cooling energy.

Chilled water heating convertor 196 is connected by hot water line 204 and return line 205 to generated hot water supply line 48 and return line 49, respectively, and thermostatic responsive control valve $V_2$ in line 204 controls the amount of hot water flowing through convertor 196.

The location of chiller 190 is before recoil 184 of unit 24 in order to provide good dehumidification on the fresh air in summer which is supplied to the compartment units 90 at or below building dew point so little or no latent cooling is required in these units. The compartment unit coils 142 essentially run dry which will extend the life of a clean heat exchange surface and reduce the tendency for these coils to collect dirt and scale. The coil cleaning interval is effectively extended indefinitely. The heater 196 is located before the precoil 182 and improves the temperature of the air entering sprays 187 at low outdoor temperatures so that it is easier to reach moisture level required to humidify the building. Similarly the convertor is located after the recoil so that the warmest possible water is available for the recoil humidification function.

All unwanted heat at all times of the year in the building is removed through a water tower 26, schematically shown with its related water circuitry in FIG. 9. Tower 26 includes inlet dampers 208, motorized by motor $M_2$ and fan 210, driven conventionally by an electric motor (not shown). The tower is selected for typical summer performance and winterized for year round operation. The capacity of the tower 26 is such that below 40° F or thereabouts all internal heat gain can be rejected at the temperature level at which water leaves recoil 184. Most air conditioning systems today employ winterized towers to facilitate stopping and starting the refrigeration plant in intermediate weather. This type of cooling tower is well known in the art and no detailed explanation of its structure is believed necessary. However, dampers 208 are operational to reduce cooling of the condensing water during a heat reclaim cycle and, as outdoor temperatures drop, to control the capacity of tower 26 as a free cooler of the chilled water circuit during the free cooling cycle. Water line 218 connects sump 212 to condenser pump 220 which is connected by line 222 to condenser 224. Condenser 224 is connected to one end of convertor 40 via lines 226 and 227 whereas spray header 214 is connected to the other end of convertor 40 via lines 229 and 230. Condensing water bypass line 232 with bypass valve 234 connects lines 226 and 230 to bypass convertor 40 upon selective operation of valve 234 and valve 236 which valve is in line 226, it being appreciated that the convertor 40 is bypassed when bypass valve 234 is open and valve 236 is closed and that convertor 40 will be brought into operation in conjunction with condenser 224 when bypass valve 234 and valve 236 are closed and opened respectively.

Condenser 224 and chiller 190 are connected in a refrigerant circuit in the usual manner. Chiller 190 preferably includes a centrifugal fan-type compressor wherein its capacity may be controlled by controlling pre-rotation vanes in a known manner, as will be appreciated by those skilled in this art. The refrigeration circuit between chiller 190 and condenser 224 is schematically shown in FIG. 9 to include, a fan compressor P with chiller capacity controlling vanes V in line 238 and a float valve 232 in line 242.

Thermostat $T_c$ is located in the chilled water return line 166 before the inlet of heating converter 196 and once set, controls in sequence vanes V of the chiller compressor P thereby controlling the capacity of the chiller 190, motor $M_2$ of dampers 208 of cooling tower 26 thereby controlling the capacitor of the tower as a free cooler and valve $V_2$ which regulates hot water supplied to heating convertor 196. Dotted lines to each of these items to be controlled by the single thermostat $T_c$ are shown in FIG. 9. As previously noted thermostat $T_R$, master controlled by outdoor temperature stat 50, controls valve $V_1$ thereby scheduling when required the temperature of the radiation water through radiation heater 30. Thermostat $T_R$ however also controls motor $M_2$ of dampers 208 of cooling tower 26 thereby controlling the capacity of tower 26 during the heat reclaim cycle. $T_R$ accordingly controls in sequence, when there is a heat reclaim cycle, dampers 208 of the cooling tower and valve $V_1$ which regulates hot water supplied to heater 30 thereby scheduling the temperature of the radiation water as called for by ambient temperature conditions. Dotted lines to each of these items controlled by $T_R$ are shown in FIG. 9.

It should be appreciated that only the more essential features of the equipment and circuitry of my invention have been shown in FIG. 9 and the normal equipment bypasses and isolation valves have been omitted for reasons of clarity.

FIG. 10 is a 10° F temperature traverse relating to the chilled water circuitry schematically shown in FIG. 9 and shows temperatures of air and water at various locations in FIG. 9, both for high load (full sun) and low load (no sun) and for mechanical cooling and free cooling. Also shown are representative temperatures in the condensing water circuitry when there is no heat reclaim cycle in the system.

Figure 11:
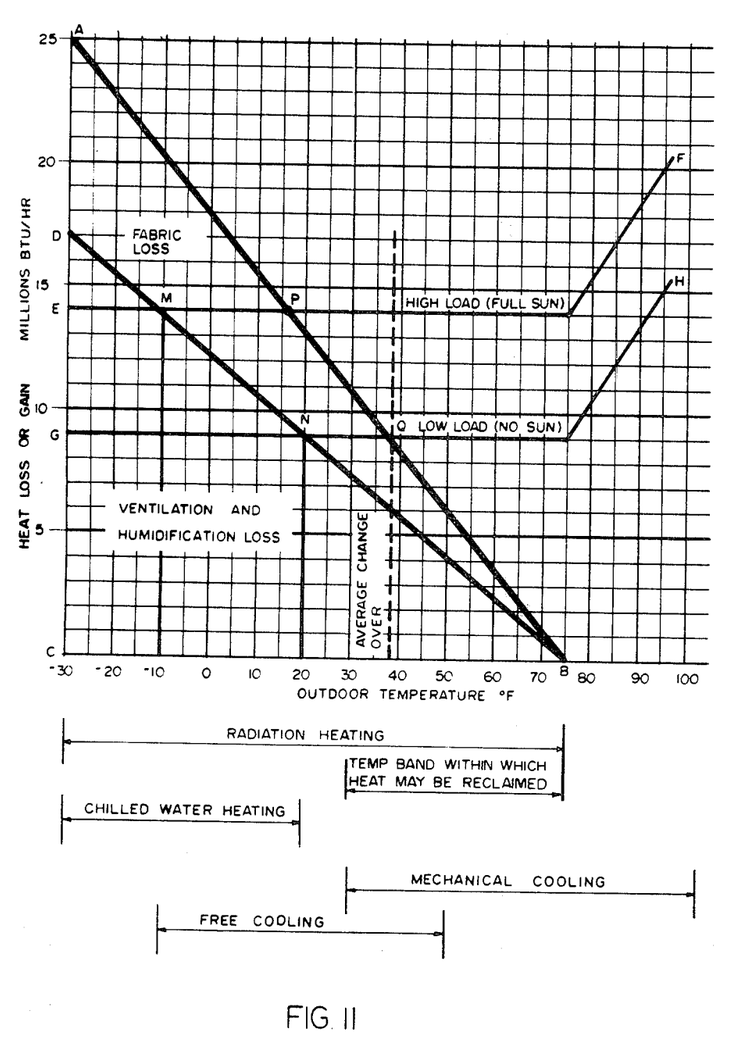
FIG. 11 is a typical heat balance diagram of a building.

FIG. 11 is a heat balance diagram with coordinates as shown with respect to a typical building such as building 10 herein. The total building heat loss is represented by area ABC and is made up of fabric heat losses, area ABD, and ventilation and humidification losses area DBC. The average internal heat gain with full sun and no sun are represented under lines E F and GH respectively. Point B (74° F) represents the average conditioned space temperature where there are no heat losses and points M and N are points at which building heat gains at high and low load are completely exchanged in the ventilation system (unit 24). In other words the building 10 in this heat balance representation runs out of internal heat at +20° F at low load and −10° F at high load. Points P and Q represent the overall building balance points at high and low loads respectively. Fabric heat loss is neutralized by the perimeter radiation.

FIG. 12 is an operating sequence chart which is believed self explanatory when considered in conjunction with FIG. 9.

OPERATION

From a review of FIGS. 9 to 12 inclusive the operational sequence and control of the various elements of my system will become apparent. The operation and preferable control of my compartmentalization system of air conditioning takes advantage of a "Control Change Relation" between the temperatures of air and water leaving the coils 142 of compartment units 90. With counterflow between air and water in the coil 142, the water will leave the coil a few degrees higher than the temperature of the leaving air. An aspect to be noted from typical coil data is that for any given temperature of air leaving the cooling coil, the water off the coil will be at a constant temperature and accordingly the temperature interval between air and water leaving the coil remains substantially constant despite the shifting of other variables within normal limits viz:

i. Water entering the coil may vary between 42° and 52° F. on a typical job.

ii. Air volume across the coil may vary from 50 to 100 percent depending on solar load and some variable internal loads.

iii. Air entering the coil may vary in dew point from 40° to 55° F. depending upon the season and the setting of the main building humidistat.

It is desired to maintain an air temperature leaving the compartment unit 90 of approximately 55° F. so that the moisture level in occupied areas will in summer never exceed a comfortable dew point of 55° F. corresponding to 50 percent Relative Humidity at 74° F., the desired average temperature of the occupied areas. In view of the "Control Change Relationship" it will be appreciated that the air leaving the coil 142 of the compartment units can be satisfactorily controlled at substantially 55° F. by maintaining the mixed chilled water in line 166 from the coils 142 at another temperature, say 60° F. which lies at a fixed interval from 55° F. due to compartment coil design, regardless of individual variation within limits of cooling load in each area. The exact temperature at which chilled water will be controlled by sensor T will depend upon the coil and water flow selection for individual designs, which selection is within the knowledge of those skilled in this art based on data available from coil manufacturers. However, with particular reference to FIG. 10 it will be noted that by keeping $T_1$ constant at 60° F, or thereabouts the compartment coils 142 gives air at $T_{c2}$ at 55° ± 0.5° F. and this happens despite air flow across the coils 142 varying from 60 to 100% for low and high interval loads, entering chilled water varying from 45° to 50° F between high and low load ($T_6$) and a dew point varying between summer and winter from 55° to 40° F. Air onto coil 142 ($T_{c1}$) also varies and is seen from FIG. 10 to vary from 79° F at low load to 77° F at high load. At lower load, with lower air flow, the returning air adds more degrees picking up the heat from the back of the lights 115 in false ceiling plenum 116.

During positive fabric transmission (100° − 74° F) the radiation subsystem is idle and humidistat H holds the building to approximately 50 percent R.H. by controlling the face and bypass dampers 185 and 186. Thermostat $T_c$ holds the chilled water return to approximately 60° F by operating vanes V on the chiller 190. All interval heat is removed through the cooling tower 26 since condenser bypass 232 is open. Chilled water bypass 176 is also open. During the heat reclaim zone (74° to 35° ± 10° F), overall heat gain within the building still exceeds generally the losses (FIG. 12) and mechanical cooling of the building continues. Chiller 190 removes heat from within the building and passes it on to condenser 224. In order to neutralize fabric loss the perimeter radiation system comes into operation with pump 32 forcing water through the radiation water circuit and through convertor 40 since radiation bypass 47 is closed. Condenser 224 is operationally connected to convertor 40 by closing condenser bypass 232. Chilled water bypass 176 remains open. Accordingly, during this zone of operation radiation water provides perimeter heating to neutralize fabric heat loss, the heat being reclaimed from the building interior through convertor 40 and the condensing water. As temperature drops within this zone fabric heat loss increases proportionally to the drop in temperature. Thermostat $T_R$ as mastered by outdoor stat 50 schedules the radiation water by first controlling motor $M_2$ of the motorized dampers 208 of the cooling tower 26 and then, if necessary Valve $V_1$. The operative closing of dampers 208 as outdoor temperature drops within this zone reduces the evaporative tower cooling of condensing water and accordingly the temperature of the condensing water entering convertor 40 increases. When dampers 208 are tightly closed no cooling of the condensing water occurs. (See FIG. 10, columns $T_7$ and $T_8$ within mechanical cooling and the heat reclaim temperature zone). As the outdoor temperature approaches the "change over temperature" whereat mechanical cooling is replaced by free cooling through tower 26, it may be necessary to "top off" the radiation water by opening valve $V_1$ under control of $T_R$ as mastered by stat 50 to permit hot water from means 20 to enter heater 30 thereby bringing the radiation water up to the temperature called for by $T_R$.

In my system without a heat reclaim cycle it will be appreciated that lines 41 and 43 are absent from the radiation water circuitry and radiation water returns directly from line 39 to heater 30. There would be no control link between $T_R$ and tower dampers 208 and cooling tower 26 would remove all unwanted heat from the building, condensing water bypass 232 being of course open (See FIGS. 10 $T_7$ and $T_8$ no heat reclaim mechanical cooling). $T_R$ through valve $V_1$ would be the sole means of scheduling the radiation water and it will be appreciated that heater 30 could be replaced with a direct pipe connection between hot water generating means 20 and the radiation water line.

During mechanical cooling $T_C$ controls the prerotation vanes V of the chiller compressor P and it will be noted from column $T_4$ of FIG. 10 that performance of the chiller is optimized in that it is only called upon to operate at a capacity which is required by the outdoor conditions and internal load conditions. The single chiller 190 is not required to continually perform to a base temperature such as 41° or 42° F as in conventional systems. The energy input to the chiller is optimized by direct control of the inlet vanes V on the chiller. Only at full load and at temperatures above 60° F need the requirements for cooling to such a base temperature occur. At other temperatures and load, the vane V controls the chilled water production with corresponding less energy input for each unit of cooling.

As the need for cooling declines $T_C$ raises the temperature leaving the chiller until the outdoor temperature is low enough that the requirement for mechanical cooling may cease, and the system may be switched to free cooling. When the outdoor temperature is 35° F or thereabouts depending on equipment selection, mechanical cooling is discarded in favour of free cooling with the water cooling tower 26. At the change-over from mechanical to free cooling, humidistat H is reversed for winter operation, condenser bypass 232 remains closed, radiation bypass 47 is opened and convertor bypass 176 is closed thereby permitting chilled water to flow through convertor 40 during the free cooling cycle. It will be seen from FIGS. 10, 11 and 12 that the zones of mechanical cooling and free cooling are shown to overlap approximately 20° F. The heat reclaim cycle of course operates within the zone of the mechanical cooling and is stopped with changeover to free cooling. The typical water tower 26 and conventional convertor 40 for generating chilled water during free cooling, with water off the convertor 40 having a maximum range of from 45° to 51° F at high and low loads respectively (FIG. 10 column $T_9$ free cooling), would provide an average changeover temperature of 38° F or thereabouts, taking into consideration the variations in outdoor relative humidity.

It will be noted that with a heat reclaim cycle which is utilizing the condensing liquid circuit, convertor 40 and tower 26, the condensing liquid is a heated medium whereas upon switchover to free cooling the condensing liquid becomes a chilled medium. Accordingly, at the time of switchover from mechanical cooling to free cooling radiation bypass 47 will be opened with heater 30 through $T_R$ and $V_1$ taking full control of the heating requirements of the radiation liquid. With $T_R$ no longer controlling $M_2$, vanes 208 open fully and the temperature condensing liquid entering converter 40 will quickly drop (compare volumes $T_8$ in FIG. 10). The mechanical cooling means including chiller 190 and condenser 224 is stopped permitting tower 26 to further bring down the condensing liquid temperature. Chilled water bypass 176 is then closed completing the change over to free cooling. The reverse procedure is followed in switching from free cooling to mechanical cooling. The total switchover is accomplished without a significant rise in chilled water temperature.

Although at average load the overall building heat balance point would approach 25° F (FIG. 12), the probable low limit of successful heat reclaim for the building, taking into account the likelihood of surging in the chiller 190 at lower temperatures, would approximate a temperature of 30° F. The average changeover of 38° F or thereabouts accordingly also eliminates the likelihood of surging problems in the chiller. During free cooling, control of water chilling is accomplished by $T_C$ controlling the motorized inlet dampers 208 on the water tower 26. The outdoor temperature is low enough that internal building heat is freely utilized in the preheat and humidification of ventilation air. Humidity in the building 10 is held to approximately 35 percent RH by control of the face and bypass dampers 184, 186 through humidistat H. When building 10 runs out of internal heat at temperatures +20° and −10° F at low and high loads, the return chilled water drops below set point and tower fan 210 is deactivated whereby, accordingly, further cooling in converter 40 of chilled water does not occur. Thermostat $T_C$ calls for heating and the return chilled water and operatively controls valve $V_2$ to introduce heating to the return chilled water through heating convertor 196. (column $T_2$ of FIG. 10 illustrates the heating of the return chilled water). The internal building heat plus the added generated heat is utilized in the preheat and humidification of ventilation air.

Whether the chilled water is produced through mechanical cooling, or a free cooling thereof by the incoming ventilation air when the temperature is low enough, chilled water is fed to the coils 142 of each compartment unit 90 on each floor 16 at a temperature depending on load and temperature conditions (see column $T_6$ of FIG. 10) which will produce approximately $55° \pm 0.5°$ F air leaving the compartment unit 90 (Column $T_{C2}$ FIG. 10) regardless of load or conditions within the variations previously noted. In operation, it will be appreciated that thermostat $T_C$ will have a range for control such as 58.5 to 61.5 or thereabouts. As chilled water returns above the upper limit or below the lower limit of the set point range, $T_C$ will call upon, as required, the chiller 190 or tower 26 to vary its capacity or heater 196 to inject heat to the chilled water. The ventilation air ($T_{V3}$, FIG. 10), preconditioned as to temperature and humidity as previously noted, mixes with return air from the spaces to be conditioned. ($T_{V1}$ FIG. 3). This mixing occurs within closet 82 and the mixture is conditioned in unit 90 in heat exchange with unit coils 142 to provide leaving air of $55° \pm 0.5°$ F or thereabouts. The leaving air is distributed to the spaces to be conditioned as called for by the variable air volume terminals 94 under control by thermostat 124. Even with a single floor in full shade, the leaving air temperature on the floor will drop only 3° F when other units are on maximum duty. Accordingly, it is possible to provide 55° and ± 3° F at all terminals during normal building occupancy with only one thermostat $T_C$ controlling the source of cooling.

All compartment units are centrally controlled from one master control area in the apparatus penthouse 18. As previously noted, selective floor after hours operation is entirely feasible with my invention, the dampers 156 being motorized to close down when the respective floor units 90 are shut off. However, it will also be appreciated that in addition to shutting down those individual floor units not in use for after hours operation, it is also available to shut down the ventilation and humidification unit 24 and to provide cooling on the after hour floors without fresh air. Moreover, it is possible in more northern locations to shut down the chiller on summer evenings and to bring into operation converter 40 as part of a free cooling cycle, as in most northern cities chilled water (60° F or thereabouts) can be obtained for most evenings from the free cooling cycle using the water tower. This would also provide sufficient cooling for cleaning staff during such evenings.

System upkeep on a floor-by-floor basis is minimal since there is no automatic valves or mixing dampers on any floor, and indeed no automatic control valves are required in the entire chilled water circuit. Accordingly, my system is less height sensitive because it requires few control valves and none below the top level of the building. Filter maintenance on the compartment units is minimal and can be carried out at the same intervals of fan lubrication. Field noise problems associated with conventional system installations are reduced to the point of virtual elimination as each unit 90 is presilenced by the manufacturer. Heat reclaim is accomplished without a double condenser or closed circuit tower or special pumping circuits. The initial cost of requiring installation of conditioning equipment to each floor in conventional systems is no longer present. Floors may be included in the system as they are rented without problems in rebalancing air and water systems each time one is brought into the system. There is no temperature stratification at the various coils and no series-parallel seasonal changeover in the feeding of outside air coils as in several conventional systems. With my system life safety is enhanced through not only static control of smoke dispersal but dynamic control through pressurization of elevator shafts and stair wells. Non-rentable building area for fans and shafts is reduced and this is an improvement is usable area at the perimeter.

It will be appreciated by those skilled in this art that although I have described in detail the preferred form of my invention, various modifications may be made thereto without departing from the spirit of my invention, as defined in the appended claims. For example, the chiller 190 need not be located between the precoils and recoils of unit 24 but can be located before or after the chilled water heater 196. It will further be appreciated by those skilled in this art that, as in the case of the preferred embodiment herein as well as the above-noted variation in the placement of the chiller, it may be bypassed in order to assure its protection when not in use. Similarly, simple bypasses to the condenser 224 and heaters 30 and 196 are possible within the contemplation of my invention, and the usual isolation valves associated with bypass connections would be present.

Where the term "water" has been used, it will be appreciated that other heat exchange liquid media may be used without departing from the spirit of my invention.

Further the applicant has used the term "precoil" in this specification to designate that coil in the fresh air conditioning means which under certain conditions may be operating as a pre-heating coil and under other conditions may be operating as a pre-cooling coil with regard to incoming fresh air. Similarly the term "recoil" in this specification is used to designate that coil in a fresh air ion conditioning means which may operate as a re-heating coil or as a re-cooling coil to the fresh air under different climatic conditions.

The embodiments of the invention in which an exclusive property or privilege is claimed are defined as follows:

1. In a system for air conditioning a multi-storey building having an air handling unit in a compartment on a floor to be conditioned, variable air volume distribution means for distributing conditioned air from said unit to spaces on said floor and means for permitting air to return to said compartment from said spaces, each of said units including cooling coils in heat-exchange relation with air passing therethrough, fresh air conditioning means including a chilled water piping circuit with a precoil and a recoil remote from said floors and providing conditioned fresh air to each said compartment for mixing with return air from said spaces, the chilled water piping circuit including each of said unit cooling coils feeding a common return line and including cooling means remote from said floors and said precoil and recoil, and thermostatic control means responsive to the temperature of chilled water in said common return line for controlling the cooling capacity of said cooling means, thereby maintaining a predetermined difference between the temperature of the chilled water in said common return line and the temperature of air off said unit cooling coils.

2. In a system for air conditioning a multi-storey building having an air handling unit in a compartment on a floor to be conditioned, variable air volume distribution means for distributing conditioned air to spaces on said floor and means for permitting air to return to said compartment from said spaces, each of said units including cooling coils in heat-exchange relation with air passing therethrough for conditioning return air, fresh air conditioning means including a chilled water piping circuit with a precoil and a recoil remote from said floors for conditioning fresh air, and means for conveying conditioned air to said distribution means, the chilled water piping circuit including each of said unit cooling coils feeding a common return line and including cooling means remote from said floors and said precoil and recoil, and the thermostatic control means responsive to the temperature of chilled liquid in said common return line for controlling the cooling capacity of said cooling means, thereby maintaining a predetermined difference between the temperature of the chilled water in said common return line and the temperature of air off said unit cooling coils.

3. The system of air conditioning a multi-storey building according to claim 1 wherein said cooling means is mechanical and includes a chiller and a condenser in a condensing water circuit, a cooling tower in said condensing water circuit whereby all unwanted building heat is removed through said tower during mechanical cooling, and said predetermined difference is maintained by controlling the capacity of said chiller.

4. The system of air conditioning a multi-storey building according to claim 3 wherein said cooling means includes a convertor, said convertor being in said chilled water circuit and in said condensing water circuit having a cooling tower, whereby when outdoor temperature approaches a predetermined temperature, said system free cools the building through said cooling tower, said thermostatic control means during the period of free cooling controlling the cooling capacity of said tower as a free cooler in order to maintain said predetermined temperature difference.

5. The system of air conditioning a multi-storey building according to claim 4 wherein said cooling tower includes motorized air inlet vanes and said thermostatic control means controls the evaporative cooling capacity of said tower as a free cooler through operation of said vanes.

6. The system of air conditioning a multi-storey building according to claim 5 further characterized by thermostatically controlled heater means in said chilled water circuit for adding heat to said chilled water in order to maintain a predetermined temperature difference when said building runs out of internal heat.

7. The system of air conditioning a multi-storey building according to claim 1 wherein said cooling means includes the precoil and recoil of said fresh air conditioning means when outdoor temperature is below a predetermined temperature, said predetermined temperature difference being thermostatically controlled through controlling the addition of heat to said chilled water, said fresh air being conditioned as to temperature and humidity through heat absorbed in the building by and added to the chilled water.

8. In a system for air conditioning a multi-storey building having an air handling unit in a compartment on a floor to be conditioned, variable air volume distribution means for distributing conditioned air from said unit to rooms on said floor and means for permitting air to return to said compartment from said rooms, each of said units including cooling coils in heat-exchange relation with air passing therethrough, fresh air conditioning means including a precoil and a recoil remote from said floors and providing conditioned fresh air to each said compartment for mixing with return air from said rooms, mechanical cooling means remote from said floors and including a vaned chiller and a condenser, a condensing water circuit including said condenser and a cooling tower, a chilled water piping circuit including each of said unit cooling coils feeding a common return line and including said chiller and said precoil and recoil, said chiller being between said precoil and recoil, means for selectively including a convertor into said chilled water circuit and the condensing water circuit, and thermostatic control means responsive to the temperature of chilled water in said common return line for controlling the cooling capacity of said vaned chiller during mechanical cooling, thereby maintaining a predetermined difference between the temperature of the chilled water in said common return line and the temperature of air off said unit cooling coils and whereby when outdoor temperature drops to a predetermined temperature, said convertor being included into said circuits when said system is switched from mechanical cooling to free cooling through said cooling tower, said thermostatic control means during free cooling controlling the evaporative cooling capacity of said cooling tower as a free cooler in order to maintain said predetermined temperature difference.

9. The system of air conditioning a multi-storey building according to claim 8 wherein said chilled liquid circuit includes heater means before said precoil for adding heat to said chilled liquid when said building runs out of internal heat, said thermostatic control means controlling the amount of heat added to said chilled liquid in order to maintain said predetermined temperature difference.

10. The system of air conditioning a multi-storey building according to claim 3 further characterized by perimeter radiation heating means, said heating means comprising a radiation liquid circuit including radiation units located at the perimeter of the building on said floor, means for scheduling the temperature of radiation liquid through said units inversely proportional to outdoor temperatures whereby fabric heat loss from the building is neutralized through heat exchange between perimeter air and said units.

11. The system of air conditioning a multi-storey building according to claim 10 further characterized by means for selectively including said convertor into said condensing liquid circuit and said radiation circuit during mechanical cooling whereby heat removed from said building in said condensing liquid circuit is reclaimed through said convertor by said radiation liquid for heating said building.

12. The system of air conditioning a multi-storey building according to claim 11 wherein said scheduling means includes a thermostat in said radiation circuit responsive to outdoor temperature, said thremostat during heat reclaim inversely controlling the evaporative cooling capacity of said cooling tower in response to changes in outdoor temperatures whereby the temperature of condensing water to said convertor increases as outdoor temperature decreases.

13. The system of air conditioning a multi-storey building according to claim 1 wherein said fresh air conditioning means include means for controlling humidity of said conditioned fresh air and wherein a humidistat is located in a vertical sanitary exhaust of the building and is reversely operable between summer and winter in association with said humidity control means whereby the humidity of fresh air entering the building is controlled.

14. The system for air conditioning a multi-storey building according to claim 1 wherein said fresh air conditioning means supplies conditioned fresh air to each said compartment through first duct means, vertical floor access means in communication with the floors of said building, second duct means from said fresh air conditioning means to said access means, damper means in each said first and second duct means selectively operable to direct conditioned fresh air from said first duct means into said second duct means and said vertical access means.

15. The system of air conditioning a multi-storey building according to claim 14 wherein said floor access means includes an elevator shaft and said damper means are motorized and responsive to smoke sensors located on each floor of the building; said first duct damper means closing and said second duct damper means opening in response to the sensing of smoke on a floor of the building whereby said fresh air is directed into said elevator shaft.

16. The system of air conditioning a multi-storey building according to claim 1 wherein said compartment air handling unit further includes filter means, fan means and noise control means, said noise control means being incorporated in said unit during fabrication to meet a predetermined noise control criterion.

17. The system of air conditioning a multi-storey building according to claim 16 wherein said unit comprises a lower coil section; an intermediate sound attenuation section, a fan section and an upper sound attenuation section, said sections being in vertical alignment, said lower coil section having a front air inlet and said filter means covering said inlet, said upper sound attenuation section having a front air outlet opening and said fan section having a front access door whereby filter, coil and fan maintenance may be carried out from the front side of the unit.

18. The system of air conditioning a multi-storey building according to claim 10 wherein said radiation units each comprise a liquid conduit including an inlet and an outlet, a plurality of thin finned elements extending peripherally from said conduit between said inlet and outlet, at least two vertical support means horizontally supporting said conduit adjacent the base of a building wall in heat exchange relation to air in the building, a covering panel extending between said vertical support means and means for hanging said panels from said support means.

19. The system of air conditioning a multi-storey building according to claim 18 wherein said radiation unit is adapted to fit under a window ledge at the perimeter of the building, said vertical support means being vertical hollow mullion members co-extensive with and in alignment with window mullions at the building perimeter, said panel hanging from said hollow mullions and of a height less than said mullions whereby air may pass under said panel in heat exchange with said thin finned conduit and out from said unit between the top of said panel and said window ledge.

* * * * *